Patented May 22, 1951

2,553,994

UNITED STATES PATENT OFFICE 2,553,994

PYRIDINE THERAPEUTIC COMPOUNDS

Heinz M. Wuest, Montclair, N. J., assignor to Warner-Hudnut, Inc., New York, N. Y., a corporation of Delaware No Drawing. Application March 31, 1949, Serial No. 84,740

5 Claims. (Cl. 260—295.5)

This invention relates to new pharmaceutical products, specifically to products having physostigmine-like action, capable of stimulating the parasympathetic nervous system.

In accordance with this invention, there are provided quaternary salts having the structural formula

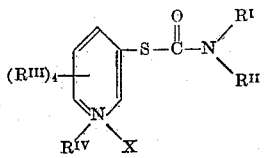

in which $R^I$ and $R^{II}$ denote alkyl, aralkyl, aryl, halogenated aryl or hydroaryl hydrocarbon radicals, which may be the same or different and each of which preferably contains not over 10 carbon atoms, or together denote a polymethylene radical containing not over five carbon atoms; $R^{III}$ denotes hydrogen, a lower aliphatic or araliphatic hydrocarbon radical, containing not over 10 carbon atoms, or halogen, said members being the same or different; $R^{IV}$ denotes an organic quaternizing radical; and X denotes a quaternizing anion. These compounds, I have found, display typical physostigmine-like action; for example, in vivo tests on dogs establish they effectively stimulate peristalsis.

The compounds of my invention may be prepared readily by reacting a 3-mercapt-pyridine with a compound having the structural formula

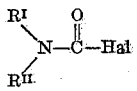

in which $R^I$ and $R^{II}$ are as above defined and Hal denotes a halogen atom, e. g. chlorine or bromine, and then converting the carbamylmercapto-pyridine formed to the desired quaternary compound. The 3-mercapto-pyridine may be prepared by the procedure described in Journal of the American Chemical Society, vol. 68, pp. 342–343, 1946, using 3-bromo-pyridine in place of the 2-bromo-pyridine. The term "a 3-mercaptopyridine" is used herein to denote not only the specific compound 3-mercapto-pyridine, but also compounds of the structural formula

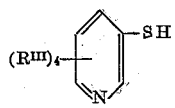

in which $R^{III}$ is as above defined, such as 3-mercapto - 6 - methyl - pyridine; 2,6 - dimethyl - 3-mercapto-pyridine; 3-mercapto-2,4,6-trimethyl-pyridine; 6 - benzyl - 2,5 - dimethyl - 3 - mercapto - pyridine; 3 - mercapto - 6 - styryl - pyridine; and halogen substituted 3-mercapto-pyridines such as 2-iodo-3-mercapto-pyridine or 2-chlor-3-mercapto-pyridine. The carbamyl halide reacted with the 3-mercapto-pyridine may be any compound of the formula

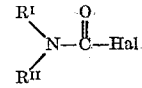

such as dimethylcarbamyl chloride, methyl-p - chlorphenylcarbamyl-chloride, diphenylcarbamyl chloride, methylbenzylcarbamyl chloride, methylcyclohexylcarbamyl chloride; methylcyclohexenylcarbamyl chloride, or tetramethylenecarbamyl chloride; corresponding bromides or iodides may also be used. The compound employed to quaternize the esters thus prepared may be any suitable compound, such, for example, as alkyl, alkylene or hydroxyalkyl halides, e. g. methyl chloride, methyl bromide, n-propyl chloride, allyl or methallyl bromide, or beta-hydroxyethyl chloride; aralkyl halides, e. g. benzyl, phenylethyl or naphthylmethyl chlorides or bromides, their methoxy, ethoxy, halo or nitro derivatives; or thienylmethyl halides such as thienylmethyl chloride or thienylmethyl bromide. The quaternizing compound is preferably one giving a primary radical in which the nitrogen atom of the ring is connected to a —CH₂— group.

My invention also comprises the production of bis type compounds, i. e. compounds such as methylene - bis - (1 - (3 - dimethylcarbamylmercapto) -pyridinium chloride) or 1,2-ethylene-bis - (1 - (3 - dimethylcarbamylmercapto) - pyridinium bromide) by reaction of a methylene halide or a 1,2-ethylene halide with a compound of the formula

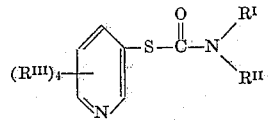

In these compounds, for the purposes of this invention, either half of the bis compound may be considered as the carbamylmercapto-pyridinium radical in the generic formula above set forth, and the second half, together with the connecting alkylene radical, as the quaternizing cation.

The unquaternized tertiary amines, i. e. compounds of the formula

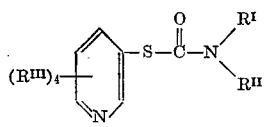

are also new compounds and are valuable intermediates in the preparation of the pharmaceutically active compounds of this invention; hence these tertiary amines are intended to be included within the scope of this invention.

The preferred compounds of my invention are the benzyl quaternary salts of 3-dimethylcarbamylmercapto-pyridine, since I have found these compounds have particularly effective physostigmine-like action.

In the preparation of the compounds of my invention, the reaction of the 3-mercapto-pyridine and the carbamyl halide may be carried out at any suitable temperature, e. g. 80° C., in a solvent such as benzene and in the presence of an acid binding agent such as triethylamine to absorb the hydrogen halide evolved, the desired ester then being recovered by fractionation. The reaction of the carbamylmercapto-pyridine to form the quaternary compound may be carried out in the presence of a solvent such as benzene at any suitable temperature, e. g. room temperature to 80° C., and the product recovered, and, if desired, purified by recrystallization.

The products of my invention may be administered parenterally in the form of aqueous solutions or orally in the form of tablets. Extensive pharmacological tests have established that the compounds of my invention possess physostigmine-like properties in that they have characteristic high toxicity of such drugs and, when tested in vivo, promote intestinal motility.

As above noted, the preferred compounds of my invention are the benzyl quaternary salts of 3-dimethylcarbamylmercapto-pyridine, such as 1-benzyl - 3-(dimethylcarbamylmercapto) -pyridinium bromide; 1-benzyl-3-(dimethylcarbamylmercapto)-pyridinium chloride; 1-benzyl-3-(dimethylcarbamylmercapto) - pyridinium dihydrogen phosphate; and 1-benzyl-3-(dimethylcarbamylmercapto)-pyridinium picrate. Among the other compounds which may be prepared in accordance with my invention may be mentioned the following: 3 - (dimethylcarbamylmercapto) - 1-methyl-pyridinium bromide; 3-(dimethylcarbamylmercapto)-1-methyl-pyridinium chloride; 3-(dimethylcarbamylmercapto)- 1-methylpyridinium picrate; 3 - (dimethylcarbamylmercapto) - 1,2,6-trimethyl-pyridinium bromide; 1-benzyl-3-(tetramethylenecarbamylmercapto) - pyridinium bromide; 1-benzyl-3-(dimethylcarbamylmercapto)-6-methyl-pyridinium bromide; 1-benzyl-3-(methyl - p-chlorphenylcarbamylmercapto) -pyridinium bromide; 1 - (p - methoxybenzyl) -3-(dimethylcarbamylmercapto)-pyridinium bromide; 3-(dimethylcarbamylmercapto) - 1-(p-nitrobenzyl)-pyridinium bromide; 1-benzyl-3-(benzylmethylcarbamylmercapto)-pyridinium bromide; 1-benzyl - 3-(methylcyclohexylcarbamylmercapto)-pyridinium bromide; 1-benzyl-3-(methylcyclohexenylcarbamylmercapto) -pyridinium bromide; 1-benzyl-3-(dimethylcarbamylmercapto)-6-styryl-pyridinium bromide; 3-(dimethylcarbamylmercapto)-1-(2 - naphthylmethyl)-pyridinium bromide; 3-dimethylcarbamylmercapto)-2-iodo-pyridinium iodide; 3-(dimethylcarbamylmercapto)-1-(phenylethyl)-pyridinium bromide; 3 - (dimethylcarbamylmercapto) - 1 - (2-thineylmethyl)-pyridinium chloride; and 1,2-ethylene-bis-(1 -(3-dimethylcarbamylmercapto) -pyridinium bromide).

The following example is illustrative of the preparation of compounds of my invention.

8.8 g. of 3-mercapto-pyridine were dissolved in a mixture of 200 cc. of benzene and 9.2 g. of triethylamine, and the mixture heated to reflux. 15.6 g. of dimethylcarbamyl chloride were then added to the refluxing solution and the resulting mixture agitated, with reflux, for four hours. The triethylamine hydrochloride which precipitated was removed by filtration and the solvents removed from the filtrate. The residual oil was then fractionated, a product distilling at 113–115° C. at 0.3 mm. being obtained; this product crystallized on standing, forming a yellow solid of melting point 46–47° C. Upon analysis this product was found to be the desired 3-(dimethylcarbamylmercapto)-pyridine.

The product prepared as above described was then dissolved in 10 cc. of benzene, 2.74 g. of benzyl bromide were added and the solution heated under reflux for two hours. A yellow solid formed which was recovered by filtration, washed with benzene and recrystallized from a mixture of absolute alcohol and ether. A colorless solid was obtained, melting at 147–148° C. Upon analysis this product was found to be 1-benzyl-3-(dimethylcarbamylmercapto)-pyridinium bromide.

In like manner other compounds coming within the scope of this invention may be prepared by substituting in the process of the above example equivalent quantities of the appropriate carbamyl halide, 3-mercapto-pyridine and quaternizing compound.

Since certain changes may be made in the compounds above described without departing from the scope of my invention, it is intended that all matter contained in the above description shall be interpreted as illustrative and not in a limiting sense.

I claim:

1. A compound selected from the group consisting of compounds having the structural formula

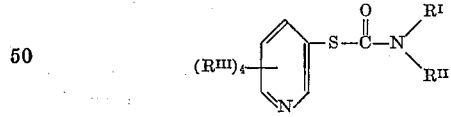

and their organic quaternary pyridinium salts, in which $R^I$ and $R^{II}$ denote a radical selected from the group consisting of alkyl, aralkyl, aryl, halogenated aryl and hydroaryl hydrocarbon radicals, and together denote a polymethylene radical containing not over five carbon atoms; and $R^{III}$ denotes a member selected from the group consisting of hydrogen, lower aliphatic and araliphatic hydrocarbon radicals, and halogen.

2. A compound selected from the group consisting of compounds having the structural formula

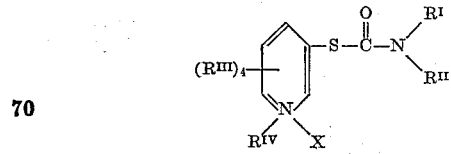

in which $R^I$ and $R^{II}$ denote a radical selected from the group consisting of alkyl, aralkyl, aryl, halogenated aryl and hydroaryl radicals, and together denote a polymethylene radical containing not over five carbon atoms; $R^{III}$ denotes a member selected from the group consisting of hydrogen, lower aliphatic and araliphatic hydrocarbon radicals and halogen; $R^{IV}$ denotes an organic quaternizing radical; and X denotes a quaternizing anion.

3. A compound according to claim 2 in which $R^{III}$ is hydrogen.

4. The compound 1-benzyl-3-(dimethylcarbamylmercapto)-pyridinium bromide, having the structural formula

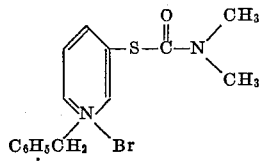

5. The compound 3-(dimethylcarbamylmercapto)-pyridine, having the structural formula

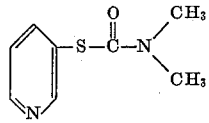

HEINZ M. WUEST.

REFERENCES CITED

The following references are of record in the file of this patent:

FOREIGN PATENTS

| Number | Country | Date |
|---|---|---|
| 613,168 | Great Britain | Nov. 23, 1948 |